United States Patent [19]

O'Brien et al.

[11] Patent Number: 5,355,779
[45] Date of Patent: Oct. 18, 1994

[54] GRILLER

[75] Inventors: William J. O'Brien, Vaucluse; Stephen J. McClean, Beverly Hills, both of Australia

[73] Assignee: Breville R & D Pty Limited, Australia

[21] Appl. No.: 82,042

[22] Filed: Jun. 24, 1993

[30] Foreign Application Priority Data

Jul. 10, 1992 [AU] Australia .............. PL3476
Mar. 9, 1993 [AU] Australia .............. 34093/93

[51] Int. Cl.⁵ .............................. A47J 37/06
[52] U.S. Cl. ........................ 99/446; 219/443
[58] Field of Search .......... 99/375, 400, 425, 444–446, 99/450; 219/443, 455

[56] References Cited

U.S. PATENT DOCUMENTS

| | | | |
|---|---|---|---|
| 1,591,291 | 7/1926 | Detwiler | 99/446 |
| 1,817,118 | 8/1931 | Adami | 99/425 |
| 2,290,658 | 7/1942 | Volks . | |
| 3,252,407 | 5/1966 | Buerki | 219/455 |
| 3,487,199 | 12/1969 | Hamlin . | |
| 3,490,359 | 1/1970 | Seitz | 99/400 |
| 3,678,844 | 7/1972 | Marshall | 99/340 |
| 3,738,256 | 6/1973 | Joeckel | 99/400 |
| 3,757,671 | 9/1973 | Warshauer et al. | 99/400 |
| 3,805,688 | 4/1974 | Gvozdjak | 99/425 |
| 3,848,110 | 11/1974 | Giguere et al. | 219/443 |
| 3,938,431 | 2/1976 | Potvin | 99/425 |
| 4,862,795 | 9/1989 | Hawkins | 99/446 |
| 4,917,006 | 4/1990 | Bowen et al. | 99/400 |
| 5,036,180 | 7/1991 | Scott | 219/443 |
| 5,105,725 | 4/1992 | Haglund | 99/446 |

Primary Examiner—David A. Scherbel
Assistant Examiner—Mark Spisich
Attorney, Agent, or Firm—Christie, Parker & Hale

[57] ABSTRACT

A griller having a substantially horizontally extending grill member to support food while being grilled, the grill member consisting of alternating bars and slots the bars being made of aluminium, aluminium alloy or a substance having similar heat transmitting properties there being arranged under the grill member an elongated electric heating element that is accommodated within a groove formed on the underside of the grill member, whereby fats and liquids emerging from food being cooked on the grill member are prevented from coming into contact with the electric heating element, an electric plug socket connected to the electric heating element directly and without intervention of a thermostat, the heating element and the grill member being constructed and arranged so that heat from the heating element is distributed more or less evenly over the surface of the grill member, the grill member being removeably supported on a container that in use underlies the grill member and acts to catch fat and liquids from the food being grilled, there being a circumferential gap between an outer wall of the container and the periphery of the grill member the width of the gap being such as to permit a flow of air into the space beneath the grill member to control the temperature of the heating element and grill member and prevent thermal run away.

7 Claims, 3 Drawing Sheets

GRILLER

BACKGROUND OF THE INVENTION

The present invention relates to a griller for the grilling of foodstuffs, such as steaks, by means of an electric heating element. The griller, the subject of the invention, can be used both outdoors and indoors.

Many forms of grillers are in use domestically and with at least some of them a problem arises as to the disposal of melted fat and liquid emerging from the foodstuff being cooked. If this fat is allowed to come into contact with the means of heating the griller smoke is produced, as are carcinogenic compounds. While forms of grillers consisting of a grid arranged to heat an article of food to be grilled, beneath which and spaced from the grid, is an electric heating element onto which fat and liquids can fall are very popular, the problems referred to above have been recognised and addressed in the specification of U.S. Pat. No. 5,036,180 which is described in the Abstract accompanying the specification as:

"An electric grill-simulated charcoal broiler for use indoors with smoke, grease/fire abatement. The iron grid is somewhat rectangular shaped with horizontal elongated grooves positioned therein for searing the meat and elongated slots to receive and direct the ensuing greases and juices through parallel openings to a water pad positioned thereunder. The electrical grill heating element positioned directly beneath the iron grid bars is not exposed to the openings. The grill element has sufficient width to impart the heat directly to the meat by way of convection and conduction. The overall unit is simple in construction composed of readily detached or removable components for accessibility and sanitation and is self-contained and may be portable".

In this construction the electric heating elements are positioned directly beneath the iron grid bars and fat is carried off in grooves formed in the upper surfaces of the bars.

SUMMARY OF THE INVENTION

The object of the present invention is to provide an electrically heated griller having similar advantages to those of the construction described above but having additional features resulting in a simpler and more effective construction. Details of these advantages are set out below.

The present invention consists in a griller having a substantially horizontally extending grill member to support food while being grilled, the grill member consisting of alternating bars and slots the bars being made of aluminium, aluminium alloy and a material having similar heat transmitting properties to aluminium, the slots passing through the grill member; there being arranged under the grill member spaced from the slots an elongated electric heating element that is accommodated within a groove formed on the underside of the grill member, whereby fats and liquids emerging from food being cooked on the grill member are prevented from coming into contact with the electric heating element, electric plug receiving means connected to said electric heating element directly and without intervention of a thermostat, the heating element and the grill member being constructed and arranged so that heat from the heating element is distributed more or less evenly over a surface of the grill member, the grill member being removeably supported on a container that in use underlies the grill member and acts to catch fat and liquids from the food being grilled, the underside of said grill member being vertically spaced above an outer peripheral wall of said container to define gap between the outer wall of said container and the underside of the grill member positioned so as to permit a flow of air transversely through the gap into the space beneath the grill member to control the temperature of the heating element and grill member and prevent abnormal heating.

In order that the nature of the invention may be better understood, a preferred form thereof is hereinafter described by way of example with reference to the accompanying drawings in which:

DETAILED DESCRIPTION

Figure 1:
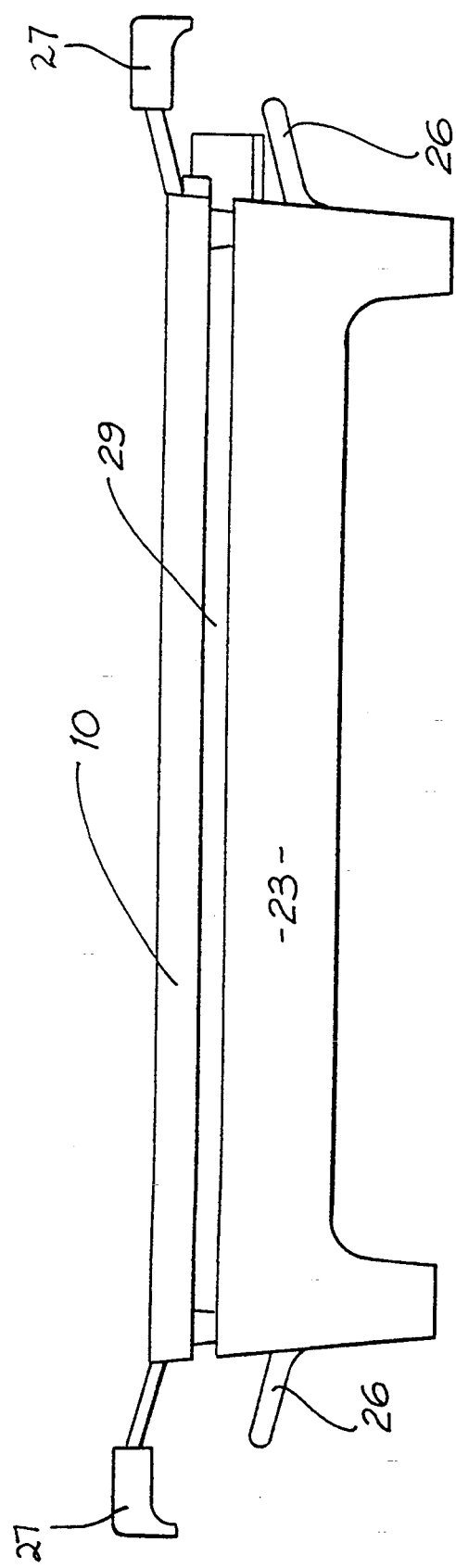
FIG. 1 is a side elevation of a griller according to the invention.

The griller in the preferred form consists of a grill member 10 which is in the form of an aluminium casting. Alloys of aluminium may be used or any other material having a similar capacity for heat transfer. For the effective operation of the griller it is important that heat from the electric heater element described below be distributed more or less evenly over the surface of the grill member 10.

The shape and configuration of the grill member can be readily seen from the drawings and it will be appreciated that this serves not only to support food being grilled but also to permit fats and liquids emerging from the food to pass through the grill member.

Figure 2:
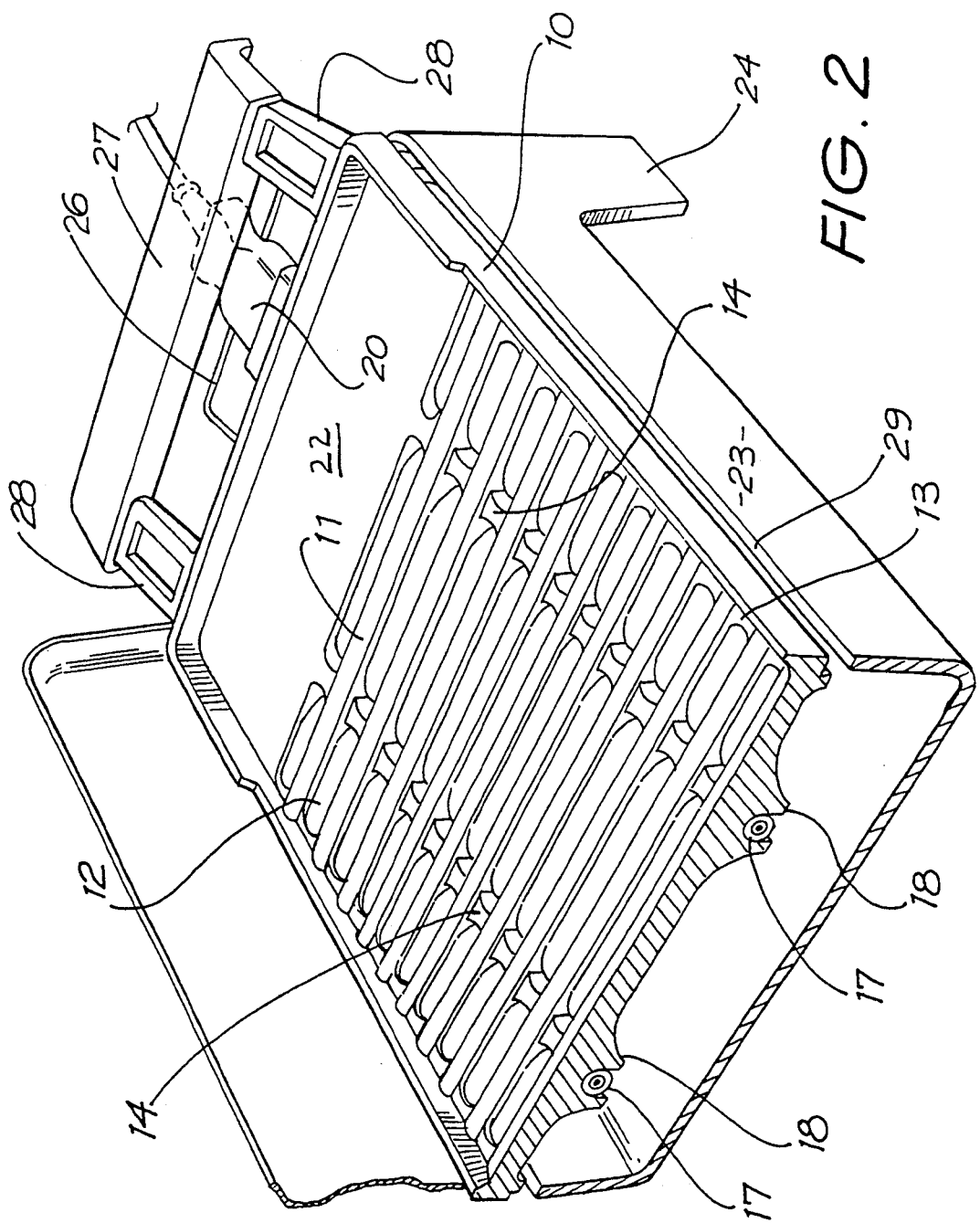
FIG. 2 is a sectioned perspective view showing one half of the griller of FIG. 1.
Figure 3:
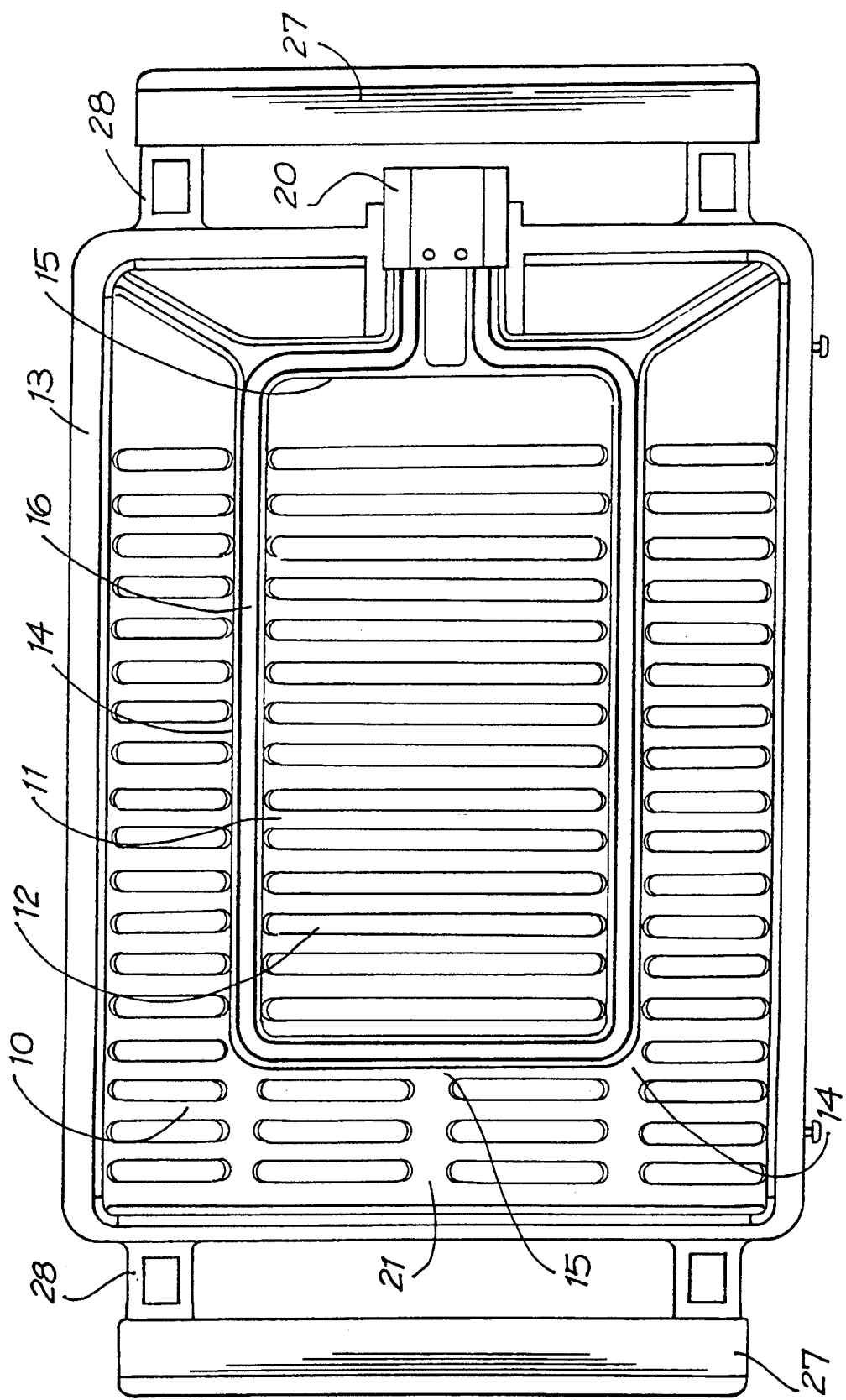
FIG. 3 is an underneath plan view of the griller.

In the embodiment illustrated, the grill member 10 consists in a series of parallel bars 11 separated by slots 12 and joined at their ends by a surrounding portion 13 and having two parallel longitudinally extending members 14 and two transversely extending members 15 which between them receive on their undersides an electric heating element 16. This is accommodated in a groove 17 on the underside of the members 14 and 15, as is best seen in FIG. 3, and this is held in place by staking (not seen). FIG. 2 shows that the heating element 16 is largely shielded from fat and liquids flowing from foodstuffs being cooked. The upper surfaces of the bars 11 are slightly rounded to assist in effecting a fast runoff of fats and liquids from food being grilled. The edges 18 of the groove 17 extend below the heating element 16 to shed fat or liquid emerging from food being grilled and to prevent its reaching the heating element 16. The heating element 16 is connected to an electric socket 20 into which a standard plug may be inserted. The electric heater element 16 which, for a griller of the size indicated, may be a 1600 watt element as this has been found to maintain the temperature of the grill member at about 280° C. where the weight of the grill member is about 3.5 kg.

In most electric grillers overheating is prevented by the incorporation of a thermostat in the electrical circuitry. This, however, has the disadvantage that the griller cannot be immersed in water for cleaning. A griller according to the present invention dispenses with a thermostat and temperature control is achieved by careful design which achieves a balance between the heat output of the heater element and the mass of metal in the grill member, and by proper choice of the size of the air gap 29 thermal runaway being, guarded against by the provision of air circulation in the manner described below. The fact that the grill member can be totally immersed in water for cleaning is a very substantial practical advantage.

The arrangement of the heater element 16 in the configuration shown in FIG. 3 ensures substantially even heating of the grill member over the whole of its surface. It is to be noted that in use the highest temperature achieved in the heating element is at the part immediately opposite the plug 20 and to help dissipate heat at this point additional metal is included by means of the member 21.

The grill member 10, at one end, has a portion in the form of a plate 22. This is arranged to have a temperature of about 200° C. which acts as a cool spot for the cooking of materials such as tomatoes, onions or mushrooms which require a lower cooking temperature than, for example, does a steak. The temperature in this area is reduced by providing the heating element with "a cold end" that is to say that the heating element proper is terminated a short distance before the plug 20 and is connected to the plug by low resistance conductors. The whole of the grill member 10 is covered with PTFE which, while being capable of resisting cooking temperatures, also greatly facilitates cleaning.

The grill member 10 is supported on the periphery of a shallow container 23 which serves to catch fat and liquids from food being grilled. This can either be used as a receptacle for water or absorbent material thus providing two different means of dealing with fat and liquid from the food being cooked. The bottom of the container 23 may be coated with a heat reflecting coating or covered with aluminium foil to reflect heat back to the grill member 10 with a view to preventing the temperature of any surface on which the container is placed from being heated to an unacceptable temperature. The container 23 is provided with legs 24 which act to support it so that there is a space between the container and any table top on which the griller is placed and the temperature of the table top may be controlled by making the legs 24 shorter or longer.

As is best seen in FIGS. 1 and 2, the periphery of the grill member 10 is separated from the peripheral edge of the container 23 by an air gap 29. This air gap has a most important function in permitting the inflow of air to cool the grill member 10 and protect the heating element from thermal run away without the necessity for incorporating a thermostat in the construction. The width of the gap 29 must be correctly chosen so that the grill member is not cooled unduly or insufficiently. For any particular griller the correct width of this gap can only be determined by experiment. This form of temperature control of the grill member has another advantage and that is that if an item of food is placed on the grill member it immediately reduces the surface temperature of the bars 11 and thus the searing effect on the food. However, with the present design the placing of, for example, a steak on the grill member blocks off some of the slots between bars 11 thus diminishing the flow of air through the grill member and reducing the drop in temperature caused by placing the steak on the grill member.

After the grilling of a foodstuff has been completed the plug 20 may be removed and, by means of the handles 26, the whole container and griller may be taken to the table and the food served directly from the grill member 10.

The grill member 10 is provided at each end with a ceramic or phenolic handle 27 which is spaced apart from the grill member by supports 28 which are made hollow to minimise the transmission of heat from the grill member to the handle. After removal of the plug 20 the grill member may be removed by means of the handles 27 and placed in water for washing. As pointed out above this is possible due to the absence of a thermostat in the construction.

In an alternative form of construction not illustrated the heating element 16 may be cast into the grill members 11 and 12 instead of being held in position by staking as illustrated.

The embodiment of the invention described above is merely illustrative of one form of embodiment of the invention, the construction of the griller being capable of variation within the general scope of the invention as defined above.

We claim:

1. A griller having a substantially horizontally extending grill member to support food while being grilled, the grill member consisting of alternating bars and slots the bars being made of material selected from the group consisting of aluminum, aluminum alloy and a material having similar heat transmitting properties to aluminum, the slots passing through the grill member, there being arranged under the grill member and spaced from the slots an elongated electric heating element that is accommodated within a groove formed on an underside of the grill member, whereby fats and liquids emerging from food being cooked on the grill member are prevented from coming into contact with the electric heating element, electric plug receiving means connected to said electric heating element directly and without intervention of a thermostat, the heating element and the grill member being constructed and arranged so that heat from the heating element is distributed over a surface of the grill member, the grill member being removeably supported on a container that in use underlies the grill member and acts to catch fat and liquids from the food being grilled, the underside of said grill member being vertically spaced above an outer peripheral wall of said container to define a gap between the outer wall of said container and the underside of the grill member positioned so as to permit a flow of air transversely through the gap into the space beneath the grill member to control the temperature of the heating element and grill member and prevent abnormal heating.

2. A griller as claimed in claim 1 wherein the groove formed on the underside of the grill member is defined by sides that extend below the heating element to promote the shedding of fats and liquid from food being cooked to prevent it coming into contact with the heating element.

3. A griller as claimed in claim 1 having an area intended for the cooking of foodstuffs at a lower temperature, the lower temperature in this area being achieved by the termination of the heating element a short distance before the electrical plug receiving means.

4. A griller as claimed in claim 1 wherein both the container and the grill member are provided with handles of insulating material whereby either the container together with the grill member may be placed on a table for direct service of food from the grill member or the grill member may be removed from the container for washing.

5. A griller as claimed in claim 1 wherein upper surfaces of the bars are slightly rounded to expedite the flow of fats and liquid from a foodstuff being grilled.

6. A griller as claimed in claim 1 wherein the power consumption of the heater element is 1600 watts and the weight of the grill member about 3.5 kg.

7. A griller as claimed in claim 1 wherein the container is provided with legs that support the container at a distance above a table surface to control the temperature of the table surface during operation of the griller.

* * * * *